Figure 1:
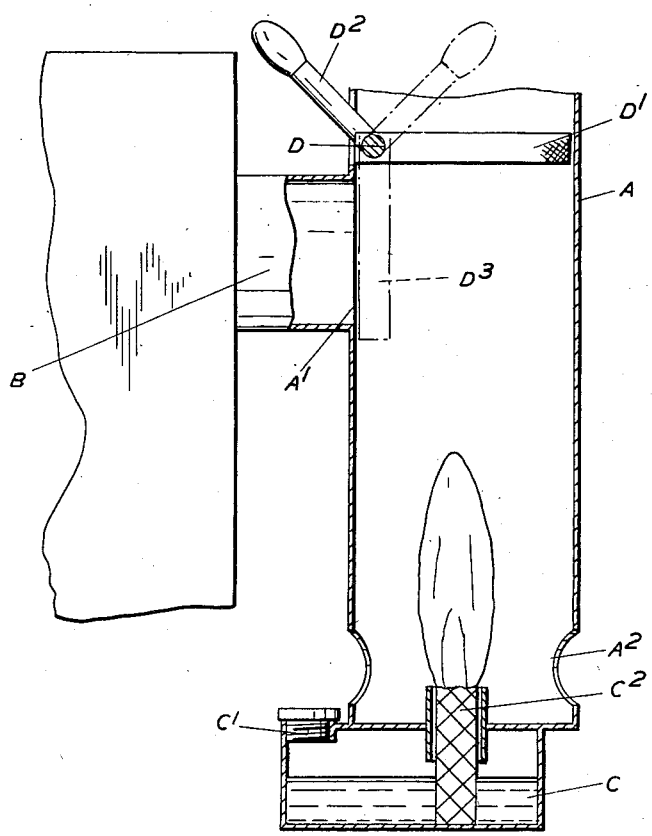

March 9, 1954  J. F. ALCOCK  2,671,438
APPARATUS FOR ASSISTING STARTING
OF INTERNAL-COMBUSTION ENGINES Filed Dec. 27, 1951 2 Sheets-Sheet 1

Inventor
John F. Alcock,
By
Attorney

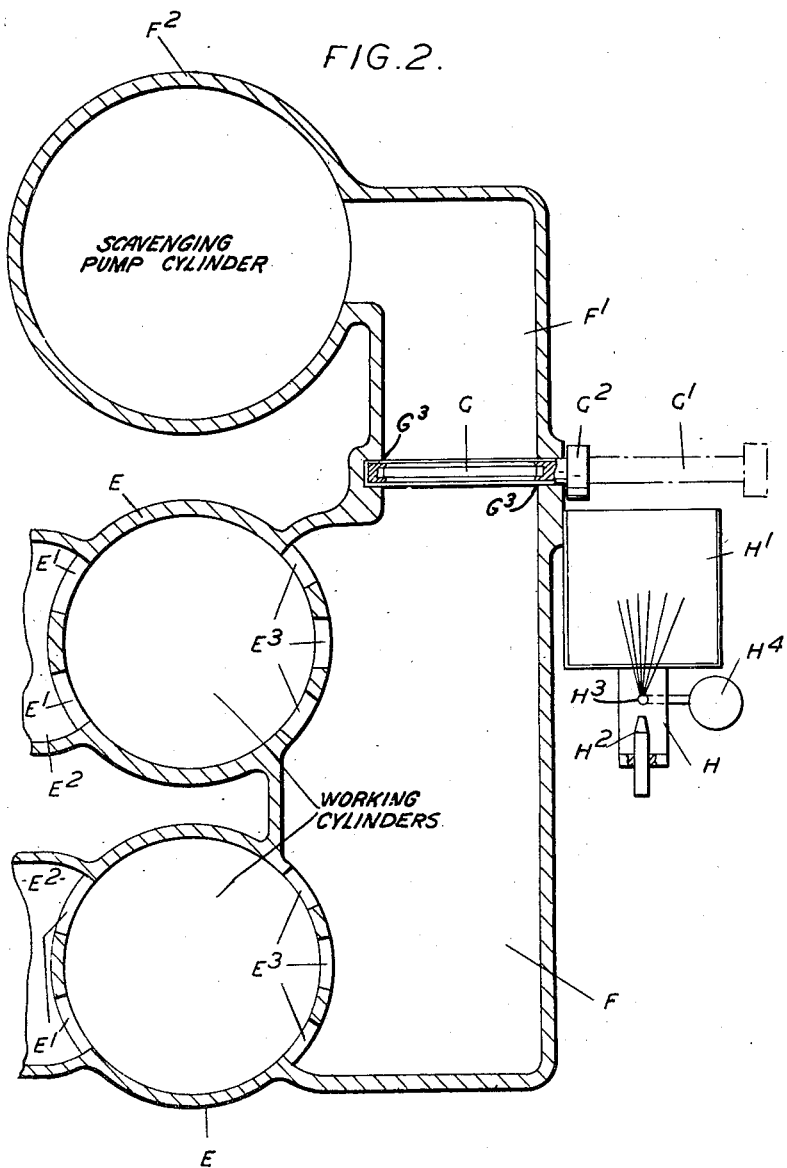

Patented Mar. 9, 1954

2,671,438

UNITED STATES PATENT OFFICE 2,671,438

APPARATUS FOR ASSISTING STARTING OF INTERNAL-COMBUSTION ENGINES

John Forster Alcock, North Lancing, England, assignor to Ricardo & Co., Engineers, (1927) Limited, London, England, a British company Application December 27, 1951, Serial No. 263,627

Claims priority, application Great Britain January 26, 1951

8 Claims. (Cl. 123—142.5)

This invention relates to apparatus for assisting the starting of internal combustion engines, especially comparatively small compression ignition engines as used for agricultural and like purposes, whether such engines are provided with electric or other power operated starting equipment or are arranged to be started by hand or foot.

In compression ignition engines, and especially engines having comparatively small cylinders, the heat loss from the charge being compressed when the engine is cooled is considerable owing to the large surface-volume ratio of the compression space and to the limit set by human strength to the speed at which hand cranking can be effected or the similar limit set by considerations of cost and dimensions to the cranking speed obtainable in practice with electric or other power operated starting mechanism. Moreover, even when power operated starting mechanism is provided it is desirable to cater for hand starting should such power operated mechanism be inoperative.

The limiting ambient temperature below which a compression ignition engine cannot be started by the means available depends upon the size and type of engine, the nature of the fuel, the cranking speed and other factors, and various proposals have been made to assist starting under conditions in which starting would otherwise be difficult, or impossible.

One well known method of assisting starting is by heating the induction air, a crude method being to light a torch of fuel-soaked material and permit the flame to be drawn into the induction system with the air, while other known methods comprise the use of an electric heater or of a tube type air heater heated externally by a blow lamp or by the exhaust of a small auxiliary petrol engine used for cranking the main engine.

An object of the present invention is to provide a simple and effective apparatus for heating the charge supplied to an internal combustion engine during the starting period which will be economical in use and for suitable applications, preferable to known forms of apparatus.

Apparatus for heating the charge supplied to an internal combustion engine during starting for the purpose of assisting starting according to the present invention comprises an inlet passage for the charge, a regenerative heat-transfer device arranged to extend across the inlet passage so that the charge passing to the engine cylinder or cylinders will be caused to flow therethrough, and a fuel burner formed and arranged so that when lit it can heat the regenerative heat transfer device.

By a regenerative heat transfer device is to be understood a heat transfer device comprising a body of heat retaining material formed to provide a series of passages through it through which the hot gases from the burner travel first so as to transfer heat to the body of the material and through which the air is subsequently drawn so as to have heat transferred thereto from the body of the material, one convenient known form of such a regenerative heat transfer device being constituted by a series of superimposed layers of metal gauze or by a mass of closely packed metal filaments the spaces between which constitute the passages for the flow of the hot gas and the air through the device.

Where the invention is applied to a four-stroke engine the regenerative heat transfer device will be arranged to extend across the air inlet or induction passages at an appropriate point. Where the invention is applied to a two-stroke engine, however, while a similar arrangement may be used, it will generally be preferable to arrange the regenerative heat transfer device to extend across the transfer port or passage through which the charging air is fed from the pump or blower to the engine so as to avoid loss of heat from the air which would otherwise occur in its passage through the pump or blower.

In any case, it is desirable that the heat transfer device should transfer a substantial quantity of heat to the air during the initial starting stage and should cool rapidly so as to supply considerably cooler air as the engine accelerates above a predetermined speed. It is therefore desirable that the heat transfer device shall consist of metal of such cross-section as to have large area/volume ratio, and preferably a surface area of at least 150 sq. ins. per cubic inch of metal.

Figure 3:
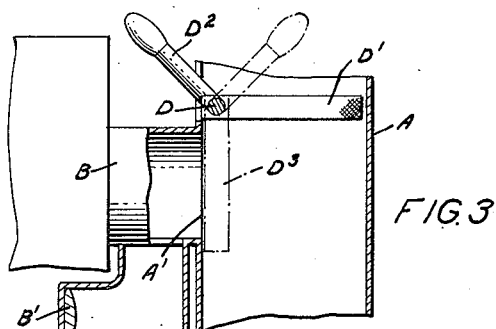

Two alternative constructions according to the invention as applied respectively to a four-stroke engine and a two-stroke engine are therefore somewhat diagrammatically illustrated in the accompanying drawings, in which Figure 1 is a sectional elevation showing a form of device according to the invention as applied to a four-stroke compression ignition engine, Figure 2 is a cross-sectional view in plan showing diagrammatically an application of the invention to one form of two-stroke compression ignition engine, and Figure 3 is a fragmentary sectional elevation similar to Figure 1 and showing a modification including a valve controlled auxiliary air inlet.

In the construction according to the invention diagrammatically illustrated in Figure 1 as applied to a four-stroke compression ignition engine the apparatus comprises a vertical tubular inlet passage or chimney indicated generally at A having a port $A^1$ at an intermediate point in its length leading to the engine induction system indicated generally at B. Arranged at the lower end of the inlet passage A is a burner comprising a fuel container C having a filling cap $C^1$ and serving to feed a wick $C^2$ projecting through a wick holder into the lower end of the passage A, combustion air for the burner being supplied through air inlet ports $A^2$.

Pivotally supported at D in the passage A is a regenerative heat transfer device $D^1$ arranged so that it can extend across the passage A at a point immediately above the port $A^1$ as shown in full line, or can be moved downwards by an operating lever $D^2$ so as to extend across the port $A^1$ as shown in chain line at $D^3$.

The regenerative heat transfer device $D^1$ may be of various forms but in one satisfactory form comprises a circumferential frame carrying a number of superimposed layers of metal gauze of a gauge such as to give a high surface-volume ratio, the wire from which the gauze is formed having for example a diameter such as to provide a surface area of at least 150 square inches per cubic inch of metal. The device $D^1$ might consist for example of six superimposed layers of metal gauze each of 20 x 20 mesh of 28 I. W. G. wire supported in a suitable surrounding frame.

In operation, when the engine is to be started the regenerative heat transfer device $D^1$ is moved into the position shown in full line and the wick $C^2$ is lit so that the regenerative heat transfer device $D^1$ is heated by the products of combustion from the burner passing up the passage or chimney A. When this heating operation has been completed, for example after a period of from 30 to 60 seconds, the regenerative heat transfer device $D^1$ is moved into the position indicated at $D^3$ and the engine is rotated in normal manner so that air is drawn into the induction system B through the heated device $D^1$ on its passage to the engine and is thus itself heated in a manner tending to ensure good starting. The arrangement may either be such that each filling of the fuel container C provides one start or such that each filling is intended to supply fuel for more than one start, in which case the burner $C^2$ may either be extinguished artificially when the engine is started or may be automatically blown out by the normal induction of air through the passage A when the engine begins to run.

After starting of the engine has been effected the heat transfer device $D^1$ may either remain in the position $D^3$, may be moved into the position $D^1$ or may be moved out of that position into one in which air can flow freely to the engine without passing through the device.

A suitable fuel for the burner $C^2$ is alcohol, for example methylated spirits.

In a modified arrangement, as shown in Figure 3, a loaded flap valve $B^1$ may be provided controlling an auxiliary air inlet opening in the passage B, the loading of the valve and the arrangement being such that the valve will remain closed during the initial starting period when the speed of rotation of the engine is low but will open automatically under the increased suction produced when, having started, the engine accelerates above a predetermined speed, so as to admit a proportion of unheated air to the passage B in addition to the air passing through the heat transfer device $D^1$. Thus for initial firing it is desirable that the air should be delivered to the engine at a relatively high temperature, but once the engine has started and accelerates above a predetermined speed a cooler charge is desirable. The flap valve referred to will thus be so loaded in relation to the resistance to flow through the heat transfer device that the flap valve remains closed until the engine has accelerated to the speed at which dilution with cooler air becomes desirable. The valve will then automatically begin to open and will open progressively to admit more and more cool air as the engine speed increases. With such an arrangement the heat transfer device would preferably be swung from position $D^3$ into position $D^1$ or into an intermediate position for normal running so as to admit air to the passage B from the passage A without such air passing through the heat transfer device; and under such conditions the flap valve may or may not remain open.

In the alternative construction diagrammatically illustrated in Figure 2 the engine is of the two-stroke type and comprises two working cylinders E having exhaust ports $E^1$ leading to exhaust passages $E^2$, and scavenging and charging ports $E^3$ communicating with a scavenging air duct F arranged to be supplied with air through a passage $F^1$ from a scavenging air pump indicated at $F^2$.

Associated with scavenging air duct $F^1$ is a regenerative heat transfer device G, consisting for example of, say, six layers of wire gauze supported in a rectangular frame, which is arranged to slide in slots $G^3$ in the passage $F^1$ so that it can occupy an operative position as shown in full lines in which it extends across the passage $F^1$, or an inoperative position as shown at $G^1$ in which it lies outside the passage $F^1$, the arrangement resembling somewhat that used for the dark slide of a camera. When in its operative position the regenerative heat transfer device G would be held in position by a quick-acting clamp or the equivalent (not shown) engaging its outer edge portion $G^2$ while it would also have an operating handle (not shown) at its outer end to permit its ready operation when hot.

Secured to or arranged to be supported from the exterior of the engine is a burner H comprising a combustion chamber or tube $H^1$ into one end of which is directed the fuel from an air blast type fuel atomizer comprising an air delivery nozzle $H^2$ and a fuel nozzle $H^3$ across which the air from the nozzle $H^2$ is directed so as to draw fuel therethrough and deliver it in a fine spray, the fuel nozzle $H^3$ communicating with a fuel reservoir $H^4$.

The air nozzle $H^2$ may be arranged to be fed with air for example from a hand or foot pump, for example a car tyre pump, or from some other source.

In operation, when the engine is to be started the regenerative heat transfer device G is moved into the position shown at $G^1$, air under pressure is supplied to the nozzle $H^2$ and the burner H is lit and maintained in operation so that the hot gases from it are directed through the combustion chamber $H^1$ on to and through the device $G^1$. When the device $G^1$ is sufficiently heated, for example after being subject to heating by the burner H for, say, 15 to 30 seconds, operation of the burner is cut off and the device $G^1$ is moved into the position shown in full lines and held therein by a suitable clamp. The engine is then rotated for starting purposes when it will be seen that the scavenging air supplied by the pump $F^2$ passes through the regenerative heat transfer device G on its way to the cylinders E so as to be heated and thereby tend to ensure satisfactory starting of the engine.

It will be seen that the present invention has the advantage over the use of a torch for heating the induction air that the air is not diluted with burnt gas which in the known torch system impedes the starting of the engines. Moreover the invention provides a lighter, simpler, less bulky and cheaper form of apparatus for heating the air than the known tube type heaters while also providing for quicker starting and use of less burner fuel since the mass of metal to be heated to starting temperature is considerably greater in a tube type heater than in a regenerative heater according to the invention giving an equivalent induction air temperature. Further, a regenerative heating device as used in the present invention will usually be more readily cleaned if and when it becomes clogged than the usual form of tubular heater and/or can be cheaply and easily replaced.

As compared with electric induction air heating apparatus the present invention is not limited to use where electric current is available either from a starting battery or an external source, does not place any extra strain on the starting battery, where provided, just at the time when a heavy drain is already being imposed on it by the starting motor, and is independent of the condition of charge of such starting battery.

It has been found that in one typical example of the invention as applied to a small compression ignition engine which with a given fuel and cranking speed required a cylinder temperature of 63° C. to start without the invention, the engine could be started at a temperature of 12° C. with the same fuel and cranking speed with the invention applied to it and used to assist starting, the particular form of the invention used in this example comprising a regenerative heat transfer device consisting of six superimposed layers of metal gauze each of 20 x 20 mesh of 28 I. W. G. wire heated for 40 seconds by a Bunsen burner using 0.15 cubic foot of town gas per minute. The gas consumption of the Bunsen burner represented a heat supply of about 45 B. t. u.'s and, since this quantity of heat will be supplied by about 1.5 cc. of petrol or gas oil it will be apparent that the expenditure of fuel necessary when using the present invention is small.

It will be appreciated that the form of regenerative heat transfer device employed may vary considerably but the type comprising a series of layers of wire gauze is in general preferred to the plate type in view of the higher surface-volume ratio which can be obtained with the wire gauze type while although in some cases refractory materials might be used, in general these would not be preferred owing to their brittleness and the risk of particles being broken off and drawn into the engine. It will further be appreciated that where a metal heat transfer device is used it must be reasonably heat-resistant, being formed, for example, of a heat-resisting steel or non-ferrous alloy such as nickel chromium. Moreover, while metal gauze has been particularly mentioned, metal wool or expanded or perforated metal could in some cases be used.

I claim:

1. Apparatus for heating the charge supplied to an internal combustion engine during starting, comprising an inlet passage communicating with the induction system of the engine, a regenerative heat transfer device arranged to extend across said inlet passage, and a fuel burner arranged when lit to heat said regenerative heat transfer device.

2. Apparatus according to claim 1, which further comprises a burner duct having at an intermediate point thereof an inlet port communicating with said inlet passage, said duct being open at one end to atmosphere and having said burner located at the other end thereof, and means for moving said regenerative heat transfer device from a first position at which it extends across said duct between the outlet thereof to atmosphere and said burner and a second position at which it extends across said inlet port.

3. Apparatus according to claim 2, wherein said heat transfer device in said first position thereof is located on the side of said inlet port remote from said burner.

4. Apparatus according to claim 2, which further comprises in said inlet passage, between said inlet port and the induction system of the engine, a loaded air admission valve adapted to open automatically on the occurrence of a predetermined depression in said induction system.

5. Apparatus according to claim 1 for use with a two-stroke engine having a scavenge or charging pump, connected with the working cylinder of the engine by a passage, wherein said heat exchange device is movable between a first position at which it extends across said passage and a second position at which it lies outside said passage for heating by said burner.

6. Apparatus according to claim 1, wherein said heat transfer device is composed of metal of cross-section providing a surface area exposed to the air of at least 150 square inches per cubic inch of metal.

7. Apparatus for heating the charge supplied to an internal combustion engine during starting according to claim 1, in which the fuel burner is arranged so that the hot gases therefrom flow through the said regenerative heat transfer device in a direction opposite to that in which the charge supplied to the internal combustion engine flows through the said heat transfer device during the starting operation.

8. Apparatus according to claim 1 which further comprises a burner duct having at an intermediate point thereof an inlet port communicating with said inlet passage, said duct being open at one end to atmosphere and having said burner located at the other end thereof, and means for moving said regenerative heat transfer device from a first position at which it extends across said duct between the outlet thereof to atmosphere and said burner for flow of hot gases from said burner through said heat transfer device in one direction, and a second position at which it extends across said inlet port for flow of air therethrough to the said inlet passage in the opposite direction.

JOHN FORSTER ALCOCK.

References Cited in the file of this patent

UNITED STATES PATENTS

| Number | Name | Date |
|--------|------|------|
| 904,267 | Korting et al. | Nov. 17, 1908 |
| 946,239 | Low et al. | Jan. 11, 1910 |
| 990,326 | Woolery | Apr. 25, 1911 |
| 1,152,744 | MacNutt | Sept. 7, 1915 |